Feb. 7, 1939. J. A. McKENZIE 2,146,264
MULCH RAKE
Filed Jan. 25, 1937
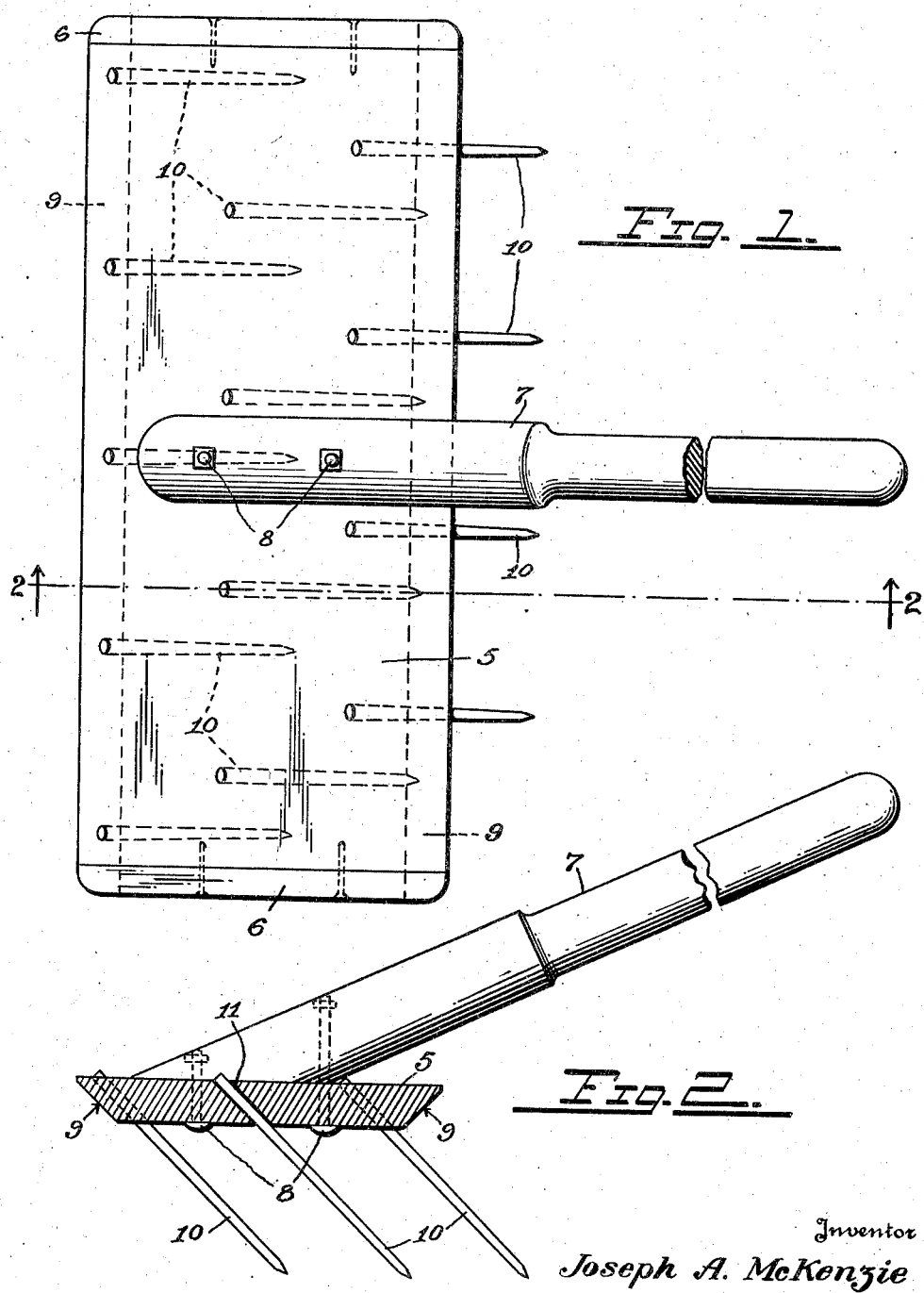
Inventor
Joseph A. McKenzie
By John W. Maupin
Attorney Patented Feb. 7, 1939

2,146,264

UNITED STATES PATENT OFFICE 2,146,264

MULCH RAKE

Joseph A. McKenzie, Seattle, Wash.

Application January 25, 1937, Serial No. 122,101

3 Claims. (Cl. 97—63)

My invention relates to mulch rakes and more particularly to a garden tool somewhat in the form of a rake, and used for breaking up the surface portion of cultivated soil. Certain objects of the invention are to provide a rake of this character that is simple, light, durable and inexpensive to manufacture. Other objects are to provide a rake having rearwardly slanting teeth disposed in such staggered relation that no two of same follow in the same path when the rake is used. Still further objects are to provide a rake having teeth passing through a rectangular board or head whose forward and rear edges are beveled under whereby the board is caused to slide on the surface of the ground when the rake is used. And still further objects are to provide a rake whereby the top cultivated soil is thoroughly broken up to the proper depth and all lumps and pebbles are brought to the surface with little effort, leaving the ground porous and in proper condition for freely absorbing moisture and air that is necessary for healthy plant growth.

In the drawing:

Figure 1 is a top plan view of the device; and

Fig. 2 is a view in vertical section taken on a broken line 2—2 of Fig. 1.

Referring in detail to the drawing wherein like reference numerals indicate like parts in the several views, the numeral 5 designates a head board of rectangular shape. As shown in the drawing, this board may be of a length that is more than twice its width, and of a thickness that is sufficient to support and hold the teeth as hereinafter set forth. The ends of the board are reenforced by strips 6 secured thereto for the purpose of preventing the board from warping as will be understood.

A handle 7, which may be six or seven feet long, is secured centrally and transversely to the head board 5 by means of bolts 8. This handle slants upwardly and rearwardly from the top surface of the board and is at right angles to the major dimension or length thereof. Both the forward and rear edges of this head board are beveled under by having their lower longitudinal corner edges cut away throughout their lengths, as shown at 9.

Very important features of the invention reside in the disposition, slant and length of the teeth 10 which will now be described. These teeth are disposed in staggered relation and in such manner that no one tooth follows in the path or wake of another tooth when the device is pulled or pushed along the ground by means of the handle 7. This arrangement is accomplished by placing the teeth in three horizontal rows equally spaced apart along the length of the head board 5 and offsetting each succeeding row an equal distance from the other rows. This will cause the teeth to be also placed in diagonal rows across the head board with each tooth an equal distance apart respecting their alignment and with all the teeth evenly distributed over the board.

The teeth 10 are driven into holes that extend through the head board 5, as shown at 11 in Fig. 2, and slant rearwardly or in the direction of the handle 7. The slant of these teeth should not be less than forty-five degrees from the vertical, or, in other words it should not be more than forty-five degrees from the horizontal plane of the head board 5. Each tooth may be about three inches in length and project not more than two and one-half inches below the bottom surface of the head board.

In the use of the rake, same is pushed forward by means of the handle 7 thus breaking up the crust and surface portion of the soil with the teeth 10. The rake is then pulled toward the user whereby the teeth sink into the ground up to their full lengths, with the bottom of the head board 5 resting on the surface of the soil. This alternate pushing and pulling is continued as the user moves backward thus leaving a smooth and untrampled surface in front of him. In pulling the device, the teeth lift the lumps and pebbles to the surface and remove all surface weeds. It is important that the teeth should not penetrate the ground more than two and one-half inches otherwise the roots of plants would be damaged when raking between rows or close to plants. The length of the teeth is therefore limited so they will not penetrate too deep, and the forward and rear edges of the head board 5 are beveled under in order that the board will slide evenly over the surface and will not sink down or bury its edges below the surface of the soil to the extent of causing the teeth to penetrate too deep. By means of my mulch rake, a gardner may readily till the top soil with very little effort and thus place the ground in condition for freely absorbing moisture and air that is essential to healthy plant growth.

I claim:

1. As an article of manufacture a mulch hand rake consisting of a rectangular head board, an upwardly slanting long handle secured to the head board, and a multiplicity of teeth projecting down through the head board and slanting with respect to the head board and in the direction of the handle at an angle that is not more than forty-five degrees from the plane of the head board.

2. As an article of manufacture a mulch hand rake consisting of a rectangular head board, an upwardly slanting long handle secured to the head board, a multiplicity of teeth projecting down through the head board and slanting rearwardly from the head board in the direction of the handle at an angle that is not more than forty-five degrees from the plane of the head board, and the forward and rear edges of the head board having their lower edge corners beveled under the full length of the head board.

3. As an article of manufacture a mulch rake consisting of a rectangular head board, an upwardly slanting long handle connected to the head board, a multiplicity of teeth projecting down through the head board and slanting rearwardly from the head board in the direction of the handle at an angle that is not more than forty-five degrees from the plane of the head board, and said teeth disposed in both horizontal rows along the head board and in diagonal rows across the head board in such manner that no two of the teeth lie in the same vertical plane that is parallel with a vertical plane longitudinally through the handle.

JOSEPH A. McKENZIE.